US007340499B1

(12) United States Patent
Casella

(10) Patent No.: US 7,340,499 B1
(45) Date of Patent: Mar. 4, 2008

(54) DYNAMIC EMBEDDING OF LITERAL OBJECT DATA IN SUPPLIED INSTANCE OF INFORMATION OBJECT

(75) Inventor: Karen A. Casella, Pacific Grove, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/454,427

(22) Filed: Dec. 3, 1999

(51) Int. Cl.
*G06F 15/16* (2006.01)
*G06F 1/12* (2006.01)

(52) U.S. Cl. .................................... 709/201; 719/315

(58) Field of Classification Search ............. 709/201, 709/203, 217, 219, 230, 245, 213, 226, 229; 707/500, 501, 513, 515, 104.1, 104; 711/137, 711/141; 718/100; 719/315
See application file for complete search history.

(56) References Cited

U.S. PATENT DOCUMENTS

| 6,006,242 | A | * | 12/1999 | Poole et al. ............... 715/531 |
| 6,108,655 | A | * | 8/2000 | Schleimer et al. ........... 707/10 |
| 6,182,122 | B1 | * | 1/2001 | Berstis ..................... 709/217 |
| 6,269,403 | B1 | * | 7/2001 | Anders ..................... 709/231 |
| 6,282,542 | B1 | * | 8/2001 | Carneal et al. ............. 707/10 |
| 6,373,974 | B2 | * | 4/2002 | Zeng ....................... 382/135 |
| 6,393,526 | B1 | * | 5/2002 | Crow et al. ................ 711/137 |
| 7,089,489 | B1 | * | 8/2006 | Brok et al. ................ 715/511 |

FOREIGN PATENT DOCUMENTS

WO  WO 99/22316  5/1999

OTHER PUBLICATIONS

Toward a Dexter-based model for open hypermedia: unifying embedded references and link objects, Gronbaek, K., et, al., Conf. on Hypertext and Hypermedia, Proc. of the the 7th ACM conf. on Hypertext, Bethesda, Maryland, US, pp. 149-160,1996, ISBN:0-89791-778-2.*

IEEE 100 The Authoritative Dictionary of IEEE Standards Terms 7th Ed., 2000, p. 650 and 682-683.*

HTML 4.01 Specification, W3C Proposed Recommendation, Aug. 24, 1999, pp. 1-389.

Introduction to WWW Caching, The National Janet Web Cache Service, [online] [printed Oct. 4, 1999] 3 pages. Retrieved from the Internet: <URL: http://wwwcache.ja.net/intro.html>.

(Continued)

*Primary Examiner*—Zarni Maung
(74) *Attorney, Agent, or Firm*—Osha • Liang LLP

(57) ABSTRACT

Techniques have been developed whereby information objects referenced in a requested information object (e.g., image, audio, video, application, and/or text objects referenced in an HTML document) are embedded in a composite object and supplied in as literal data therein in response to an object identifier (e.g., an URL request). Referenced information objects may be retrieved from cache or obtained from authoritative information servers and dynamically embedded in a composite information object. In some realizations, composite objects with embedded references are retrieved from cache. In some realizations, individual information objects (including those referenced) are cached and a composite object is dynamically prepared. In some realizations, though not all realizations, the caching techniques are employed in a proxy server implementation.

43 Claims, 5 Drawing Sheets

OTHER PUBLICATIONS

Luotonen, Ari and Altis, Kevin, "World-Wide Web Proxies," Apr. 1994, pp. 1-8.

Netscape Proxy Server 3.5 Data Sheet, Netscape [online] [printed Nov. 2, 1999] 3 pages. Retrieved from the Internet: <URL: http://www.netscape.com/proxy/v3.5/datasheet/index.html>.

SQUID Frequently Asked Questions: How does Squid work?, [online] [printed Oct. 4, 1999] 11 pages. Retrieved from the Internet: <URL: http://squid.nlanr.net?Doc/FAQ/FAQ-12.html>.

Fox, Armando et al: "Experience with Top Gun Wingman: A Proxy-Based Graphical Web Browser for the 3Com PalmPilot," Middleware. Sep. 1998, IFIP International Conference on Distributed Systems Platforms and Open Distributed Processing, pp. 407-424.

Masinter, L., "RFC2397: The data URL Scheme", Aug. 1998, Internet RFC/STD/FYI/BCP Archives [online], 4 pages, Retrieved from the Internet Jun. 20, 2002: <URL:http://www.faqs.org/rfcs/rfc2397.htm>.

* cited by examiner

DYNAMIC EMBEDDING OF LITERAL OBJECT DATA IN SUPPLIED INSTANCE OF INFORMATION OBJECT

BACKGROUND OF THE INVENTION

1. Field of the Invention

The invention relates generally to information systems, and in particular, to networked information systems wherein information objects supplied from an information service to a user agent may include references to other information objects.

2. Description of the Related Art

The explosive growth of internet-based information services, particularly World-Wide Web (WWW) based services, and the increasingly ubiquitous nature of browser technology have created an increased level of demand for network bandwidth. At the same time, typical commerce grade web sites incorporate more and more complex mixes of multimedia content such as images, audio and video, functional code such as applets, and other information objects. Because these information objects are typically served from web servers that are remote from any particular client agent (e.g., a browser), their use contributes to overall network bandwidth requirements. From a browser user's perspective, limited network bandwidth typically manifests itself in delays in rendering web pages or the images, audio and video included therein.

Caching is a technique that is commonly used in information systems to address limited bandwidth between an information source and an information target. In the context of the internet, caching techniques have long been used to improve performance of some information services, notably Domain Name Services (DNS). More recently, caching techniques have been applied to address bandwidth limitations on WWW traffic. For example, network caches are now often integrated with proxy server technology to service requests for HyperText Markup Language (HTML) content. By using such a proxy cache, a request for an HTML object ultimately served by a remote web server may be satisfied with a cached version of the HTML object stored closer to the requesting web browser. Examples of proxy caches include the CERN httpd (available in source from at http://www.w3.org/Daemon) configured as a proxy server with caching enabled, see generally, Luotonen & Altis, World-Wide Web Proxies, April 1994 (available at http://www.w3.org/History/1 994/WWW/Proxies).

Web pages are typically obtained by a web browser by requesting an HTML document from a web server (or from an intervening proxy server) in accordance with a Uniform Resource Locator (URL). In response, the web server (or the proxy server) supplies a corresponding HTML document. Web pages encoded as HTML documents frequently include references to objects such as images, applets and other HTML documents. Sometimes these references are associated with a hyperlink. References are typically encoded in the HTML document as Uniform Resource Locator (URL) references. In the course of rendering an HTML document, the receiving web browser requests these included images, applets and other HTML documents by making additional requests for the objects corresponding to these Uniform Resource Locator (URL) references. In response, corresponding web servers (or the proxy server) supply(ies) the referenced objects.

Even if each referenced object is cached by the proxy server, to render a given web page, the browser must parse the requested and received HTML document to extract the included URL references, individually request the objects corresponding to the included references, receive each of the requested objects, and finally render each of the received objects. Often, there are significant performance delays for the browser user due to the back-and-forth communication between the browser and the server or servers providing the HTML document and included objects.

SUMMARY OF THE INVENTION

Accordingly, caching techniques have been developed whereby information objects referenced in a requested information object (e.g., image, audio, video, application, and/or text objects referenced in an HTML document) are embedded in a composite object and supplied as literal data therein in response to an object identifier (e.g., an URL request). Referenced information objects are retrieved from cache or obtained from authoritative information servers and dynamically embedded in a composite information object. In some realizations, composite objects with embedded references are stored in, and retrieved from, cache. In some realizations, individual information objects (including those referenced) are cached and a composite object is dynamically prepared. In some realizations, though not all realizations, the caching techniques are employed in a proxy server implementation.

In one embodiment in accordance with the present invention, a method of improving performance in a distributed information resource environment includes retrieving a first information object corresponding to a first identifier and including a second identifier corresponding to a second information object, retrieving the second information object, and thereafter supplying, in response to the first resource identifier, an information encoding of the first information object embedding the second information object.

In another embodiment in accordance with the present invention, a method of operating a network cache includes (a) in response to an information request for a first information object that itself includes an identifier for a second information object, obtaining both the first and the second information objects; and (b) supplying an information encoding of the first information object with the second information object embedded therein. In some realizations, the method further includes storing of first and second information object instances in a data store local to the network cache and thereafter performing the supplying using the stored instances. In some realizations, the obtained first information object encodes the second information object using a resource retrieval markup element and attributes and the supplied first information object encodes the second information object as a literally included object and attributes. In some realizations or situations, the obtaining of the first information, the second information object, or both is from a data store local to the network cache. In some realizations or situations, the obtaining of the first information, the second information object, or both is from an information server displaced from the network cache by at least a communications link.

In still another embodiment in accordance with the present invention, a method of improving performance in an hypermedia information environment includes caching a first information object and an additional information object, wherein a primary uncached representation the first information object includes a hypermedia link identifying the additional information object; and supplying, a second representation of the first information object in response to a request for the first information object. The second representation includes a literal encoding of the additional information object.

In an embodiment in accordance with the present invention for a computer network including at least one information server and at least one client agent, wherein at least one first information object served by the least one information server includes a reference to at least one other information object, a cache includes a data store; and a information service interface responsive to requests for the first information object, whereby in response to at least some requests therefor, the information service interface supplies an encoding of the first information object with the other information object literally encoded therein, wherein at least one of the first information object and the other information object is supplied from the data store rather than from the least one information server. In various realizations, the cache is configured as a proxy cache, a transparent proxy cache, or a transparent proxy cache with redirection.

In still yet another embodiment in accordance with the present invention, a method of making a computer readable encoding corresponding to a first information object that itself includes a reference to a second information object includes caching both the first and the second information objects, and embedding a literal representation of the second information object in a representation of the first information object for supply in response to a request for the first information object.

In still yet another embodiment in accordance with the present invention, a computer program product encoded in computer readable media includes instructions executable to receive a request for a first information object and to retrieve an encoding of the first information object from a local cache, if available, and otherwise from a first information service therefor. The computer program product also includes instructions executable to supply, in response to the request, the first information object with a literal encoding of a second information object included therein. The first information object, as served by the first information service, includes a reference to, rather than a literal encoding of, the second information object.

BRIEF DESCRIPTION OF THE DRAWINGS

The present invention may be better understood, and its numerous objects, features, and advantages made apparent to those skilled in the art by referencing the accompanying drawings.

FIG. 2A depicts request and response flows assuming that both the web page and the referenced object miss in the caching proxy server. FIG. 2B depicts request and response flows assuming that both the web page and the referenced object hit in the caching proxy server.

FIG. 3A depicts request and response flows assuming that both a requested first information object and a second information referenced therein miss in the caching proxy server. FIG. 3B depicts request and response flows assuming that both the first and second objects hit in the caching proxy server.

The use of the same reference symbols in different drawings indicates similar or identical items.

DESCRIPTION OF THE PREFERRED EMBODIMENT(S)

Although not limited thereto, some aspects of the present invention are described herein in the context of information services, client applications, servers, encodings, information objects, markup languages, media content, communication networks and interfaces typical of World-Wide Web (WWW or "web") applications and browser technologies. This context facilitates description of an exemplary set of realizations of the present invention for caching web-based media content served to web browsers by web servers. However, based on the description herein, persons of ordinary skill in the art will appreciate additional applications to information services and information content in general, wherein the information content itself contains references to information content and wherein caching techniques in accordance with the present invention allow reduced back-and-forth request and response traffic by resolving references and embedding literal information content in response traffic supplied from the cache.

Figure 1:
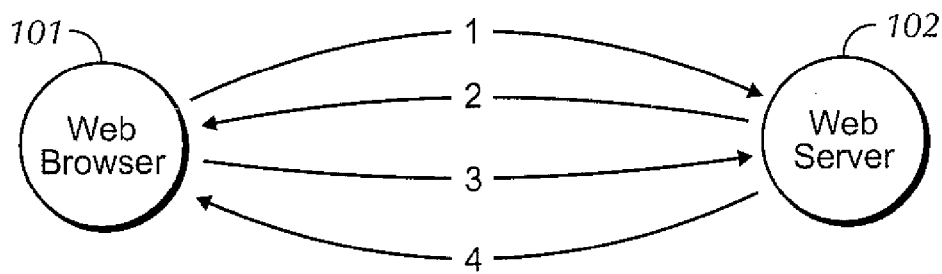
FIG. 1 depicts typical request and response flows between a web browser and a web server in a transaction involving rendering of a web page that itself includes a referenced object such as an image.

FIG. 1 illustrates typical request and response flows between a web browser 101 and a web server 102 in a transaction involving rendering of a web page that itself includes a referenced object (e.g., an image). The web page is obtained by web browser 101 by requesting (1) an HTML document from web server 102 in accordance with a Uniform Resource Locator (URL). In response, web server 102 supplies (2) a corresponding HTML document. The supplied HTML document includes a reference (encoded as an URL) to an image stored at web server 102 as a Graphics Interchange Format (GIF) file. Accordingly, web browser 101 requests (3), and in response web server 102 supplies (2), the referenced GIF file.

Figure 2A:
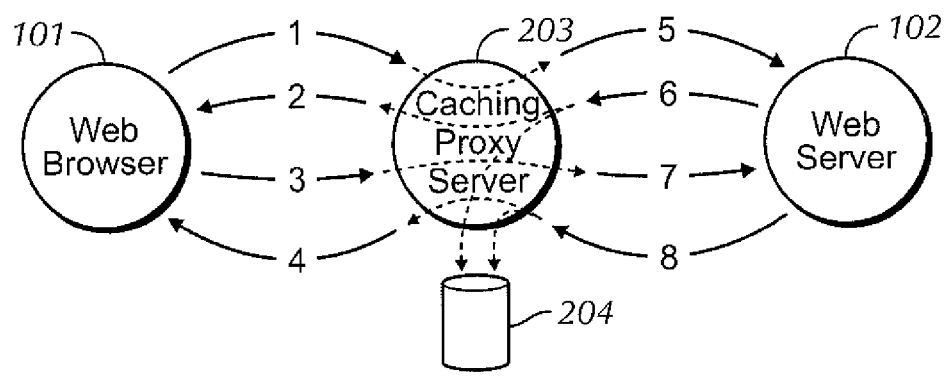
FIGS. 2A and 2B depict typical request and response flows between a web browser and a caching proxy server and between the caching proxy server and a web server in a transaction involving rendering of a web page that itself includes a referenced object such as an image.
Figure 2B:
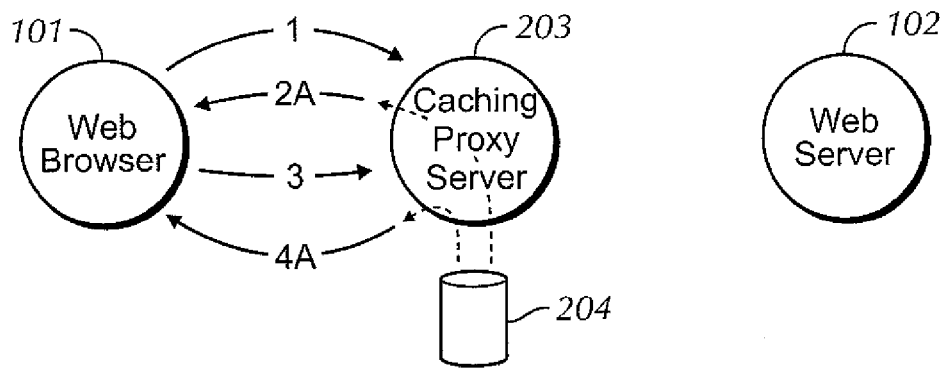

FIGS. 2A and 2B are similar, but illustrate operation of an intervening caching proxy server 203. As before, web browser 101 requests (1) an HTML document from web server 102; however, as illustrated in FIG. 2A, the request is directed to proxy server 203. If the requested HTML document is uncached, proxy server 203 proxies a request (5) to web server 102, which in response, supplies (6) the requested HTML document. Proxy server 203, in turn, supplies (2) the requested HTML document to web browser 101. Because the supplied HTML document includes an URL-encoded reference to a GIF file stored at web server 102, web browser 101 requests (3) the referenced GIF file. The request is directed to proxy server 203, and, assuming the requested GIF file is uncached, proxy server 203 proxies a request (7) to web server 102. In response, web server 102 supplies (8) the requested GIF file, and proxy server 203, in turn, supplies (4) the requested GIF file to web browser 101.

As illustrated in FIG. 2A, a local store 204 is updated to cache the HTML document and GIF file for subsequent accesses by web browser 101. FIG. 2B illustrates a subsequent access. As before, web browser 101 requests (1) an HTML document from web server 102 via proxy server 203. If the requested HTML document is cached, proxy server 203 supplies (2A) the requested HTML document from local store 204 to web browser 101. Web browser 101 then requests (3) the GIF file referenced in the HTML document supplied from local store 204. In response, proxy server 203 supplies (4A) the requested GIF file from local store 204 to web browser 101. Note that even though both the HTML document and GIF file are cached by proxy server 203, web browser 101 must resolve the URL reference in the supplied HTML document through a second request/response transaction (3, 4A). Of course, typical HTML documents will often include much larger numbers of included references to media content (e.g., URLs identifying image, video and/or audio content on web servers such as web server 102).

Figure 3A:
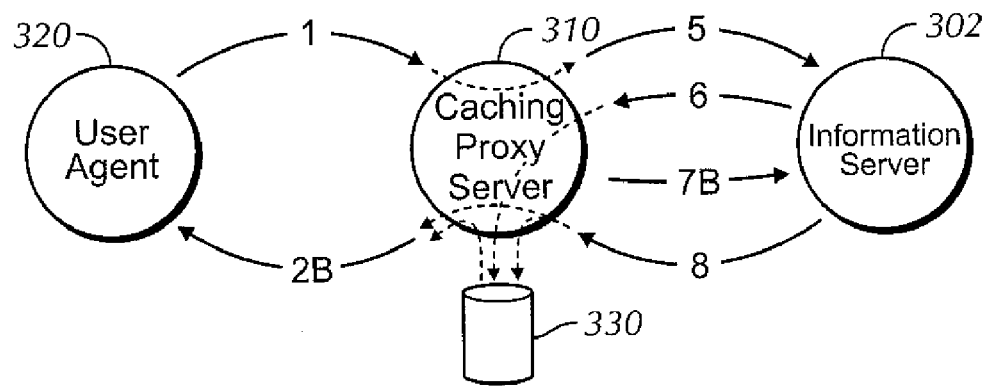
FIGS. 3A and 3B depict request and response flows between a user agent and a caching proxy server and between the caching proxy server and an information server in accordance with an exemplary embodiment of the present invention.
Figure 3B:
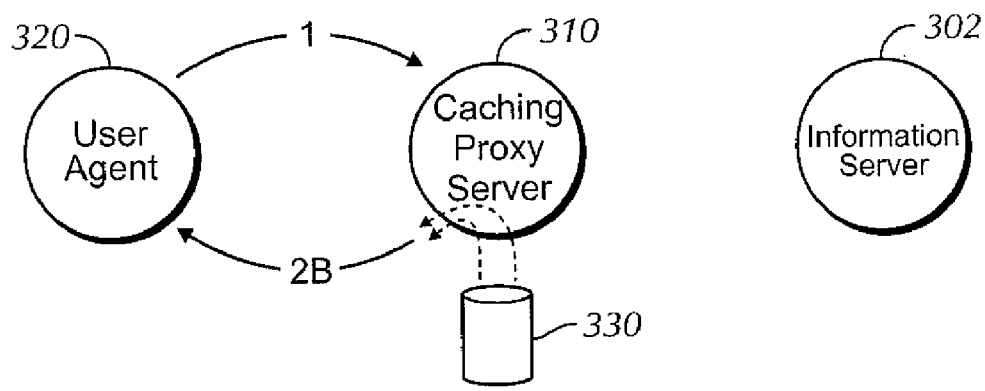

FIGS. 3A and 3B illustrate an improved configuration whereby a second request/response transaction is obviated. User agent 320 (e.g., a web browser or other information client) requests (1) a first information object (e.g., an HTML document or other hypermedia object). A first object identifier (e.g., a URL, address or other resource identifier) identifies the first information object. In the illustration of FIG. 3A, the first information object is uncached and resides at information server 302. The requested first information object (as supplied from information server 302) includes one or more references to additional information objects such as images, video, audio, application or text information objects. In one web-oriented embodiment, these references are encoded as URLs, although other encodings are possible.

Caching proxy server 310 obtains the first information object from information server 302. However, rather than supplying the first information object (with included references to the additional information objects) to user agent 320, caching proxy server 310 itself attempts to resolve the included references. For example, in the illustration of FIG. 3A, caching proxy server 310 requests (7B) an included additional information object from information server 302. In response, information server 302 supplies (8) the requested additional information object. Caching proxy server 310 then supplies (2B) user agent 320 with an instance of the first information object with the received additional information object embedded therein. Note that the received additional information object is included as a literal (rather than by reference) within the supplied instance of the first information object. In this way, user agent 320 need not initiate a request for the additional information object.

As illustrated in FIG. 3A, local store 330 is updated to cache the first and additional information objects for subsequent accesses by user agent 320 or by other user agents (not shown). In some realizations, the cached instance of the first information object includes the received additional information object embedded therein. In some realizations, both the first information object and the additional information object are cached separately. In some realizations, a composite information object is cached. FIG. 3B illustrates a subsequent access. As before, user agent 320 requests (1) the first information object using a first object identifier. Caching proxy server 310 services the request with information from local store 330. For example, in one realization, user agent 320 indexes into local store 330 using the first object identifier and retrieves a cached instance of the first information object which includes the received additional information object embedded therein. In another realization, user agent 320 indexes into local store 330 using the first object identifier, retrieves a cached instance of the first information object (this time with an included reference to the additional information object), parses the retrieved first information object to extract the included reference, indexes into local store 330 using the reference, and retrieves a cached instance of the additional information object.

In either case, caching proxy server 310 supplies (2B) user agent 320 with an instance of the first information object which includes the additional information object embedded therein. Although a wide variety of embedding schemes are envisioned and will be appreciated by persons of ordinary skill in the art based on the description herein, an HTML-oriented example is illustrative. HTML, version 4.0 (as defined by the HTML 4.01 Specification available from the World-Wide Web Consortium, W3C, online now includes a standard mechanism for embedding generic media objects and applications in HTML documents. The OBJECT element (together with its more specific ancestor elements imG and APPLET) provides a mechanism for including images, video, sound, mathematics, specialized applications, and other objects in a document. See generally, HTML 4.01 Specification, pp. 159-182, which is incorporated herein by reference.

In one realization in accordance with the present invention, instances of an information object supplied (2B) by caching proxy server 310 embed additional information objects as literal data using the OBJECT element. This embedding mechanism is presently preferred because a wide variety of browser implementations are expected to, in the future, be compatible with the HTML 4 Specification and will therefore already include support for HTML documents with embedded objects prepared and supplied by a caching proxy server or other cache configuration in accordance with the present invention. Nonetheless, other embedding mechanisms may be employed.

Use of the embedding techniques in accordance with the present invention will be better understood in the context of an HTML-oriented example. Assume that a given URL (e.g., http://www.somedomain.com/eCommerce/example.html) identifies a first information object encoded as HTML at information server 302 and that the information object (example.html) itself includes a URL identifying a second information object encoding an image (e.g., in GIF as demo.gif also at information server 302). In a conventional configuration, a servicing information resource (such as a caching proxy server without features in accordance with the present invention) would supply a web browser with the following HTML:

<html>
<body>
<img src="demo.gif">
</body>
</html> in response to a corresponding URL request received from the user agent. Thereafter, based on the <img src="demo.gif">element of the received HTML, the web browser would request the image by presenting a corresponding URL (e.g., http://www.somedomain.com/eCommerce/demo.gif). Then, the GIF-encoded image would be retrieved from cache, if cached, or supplied from information server 302, if not. In either case, the web browser first requests the first information object, and after interpreting the referencing element therein, requests the second information object. If the GIF-encoded image is cached, the back-and-forth request/response traffic spans the web browser and proxy server. On the other hand, if the GIF-encoded image is uncached, the back-and-forth request/response traffic spans the web browser, proxy server and web server. Of course, this back and forth request/response traffic is further multiplied if multiple images or other information objects are referenced in the HTML-encoded first information object.

In one realization of caching proxy server 310 in accordance with the present invention, the additional request/response traffic between user agent 320 and caching proxy server 310 is substantially reduced. In some realizations, such traffic may be substantially eliminated. As before, assume that a given URL (e.g., http://www.somedomain.com/eCommerce/example.html) identifies a first information object encoded as HTML at information server 302 and that the information object (example.html) itself includes a URL identifying a second information object encoding an image (e.g., in GIF as demo.gif also at information server 302). In response to a corresponding URL request received from the user agent, caching proxy server 310 supplies the following composite object:

<html>
<body>
<object data="data:image/gif;base64,
R0lGODlh6wApANX/AMbG2cT E18HB1b+/1L6+
07y80ru70rmSObi40LOzzbKyzK+vyq+
vya6uya2tya2t yKurx6
mpxqmpxaWlw6OjwqGhwZ6ev52dvpmZuSiYupaWu
ZKStSGRto6os 42Ns4 mJsIilr4WFroKCrIKCq39/
qnx8qHx8p315pnd3pXd3pHZ2o3R0on
NzoXFxoXFxoHBwoHBwn29vn25unmtrncDwAAAA
AAAAAAAAAAAAAAAAAA
AAAAAAAAAAAAAAAAAAAAAAACH5BAEAAD
QALAAAArACkAQAb/QJpwSCwa j8ikcslsOp/
QqHRKrVqv2Kx2y+0Ovt+
ueCzegAcN511SNIM3RAm4RCvJz/
DieQCK78NDM3hFLRd/
BxszRns0IA1nCXRkk5RRdn8 DbEIlg0RuX31Cd1+
SQ2t
FIGcHNBlzomAJNIZfFEMpmLgDRIxFowOllcGUj71
gDYpDHsWdr65 DnG9HI399RQd7GUety5
m73BfC4eLjSOXm5+jp6uvsV8p7DRLE3ea+mkTz
Xy2oZylVvOOCSnn3RwIwb1/
uCfk0IBQNX9WagSICDYw/GhQszvyySkgDM
OCE3AJJ8Uw2U/
0C5aslsGWTil88bDrlidnDM8BgKhSSCtMI/yIf/
7BEaV
HNGUJnhrpcyrSp06dQo0qdSrWqVUrbMCX4aW6Pz
CIEBygVIigaFYBX28E
cgKxdTzBFpmHrZcwK2rTrlh7gqoTmEIYOfeWKRW
RWwmdgfIUKSyTFNWOC
QxJdRhhvuayHLs5M3Mamr5x+
PQ5qAaYWzD4wNQcF5AfuZF1Eyrq2nG5GP
j6bJ9YOK/GXHsSF8hG8J/
fL2wGal25Yzry5w7s3Z9MOJgFEW5GPOSIOXt
gzzpK88f1JQ+Q4
mHlEMOM2kkIzDbQjOV6fTmnGhtsJIxZJsfrLhX2fB
PY dYuG19
kVlRITVERIbZJeUdcHlQsFB9FVo4YUYZqjhhhx26
P/hhyCGKKKI
LWwgwWMNZMBXOS114KKL7on0YnVHzHjSFN
CNyIVhucQYTj40 CcHjggR+s
WIUOeqYhYMNoEfDDCAOQGE4DCFIA2176EcD
Q3YdpWQXYe0kTAoebOCBk0WSkt54EdJyxAwlLO
fBlEIAlMJydH7pBEO+
MRHalt59kQGPZ3wlRH83vod JKTAB41gux/
xmDC4+6tmEgwnlqehhu+
nW2wAJZGDiHsCEBRugMWV3j2Hk 9VZNC/
25N94GGdympaVNEJoUmlf+
CZiBfQoRVqKbGinEY6uEdVGhQ/B4k
KrbncqTKrhOcQkmByR3
hmQLBapmmjthxsZbeWxLAOFE7jH/o4sORmtEPp
pWu0QJ+KEHU5C/DvGZpPQMgaVFq/
llhmlgGLrWMu7S5Yy8VJiXhO6dhbe vv3/
KcsZqociGBhhExseanl6Kpx3DVZgnicZEouppdN/
mNgC3Qvy7×3W6
DmCoEEAaJROrZ9xKMj8JMSdYQ8AeICoFmAq4
cBO2DaHeAMTK/EWrtsy6H
AV3PHfGPjN440CRPxvh9TIUzEcwJh6MonTLTB
dIlh+8YkTqm/lhyy03xE
YhQwwwvOBCCy648MILMBQew+
F9v8DCCiqgcIIJJIgQwgcdcKABBhZUMEE EEDiw-
wAMPONBAAwwwALropDOwwOqst7666
q6×7voCo8s+NvvqCBAAwO4G
KHC767oDQIDvvxdv/
PHIJ886AgHsLoABxxtgwO4ABNC78r8XoH3Y3Hf
vP VVBAAA7">demo
</object>
</body>
</html>

Note that the referenced image encoding is embedded as literal data in the response. If both the first and second information objects (e.g., the HTML-encoded web page and the GIF-encoded image) are cached by caching proxy server 310, caching proxy server 310 supplies the composite object directly from information stored in local store 330. Depending on whether the particular realization of caching proxy server 310 caches the information as a composite object or as multiple component objects, caching proxy server 310 may or may not need to evaluate references and prepare the composite object. However, in either case, caching proxy server 310 supplies the composite object in response to the initial URL request. If either the first or second information objects are uncached, caching proxy server 310 obtains the uncached object(s) from information server 302 and prepares the composite object for supply to user agent 320.

Figure 4:
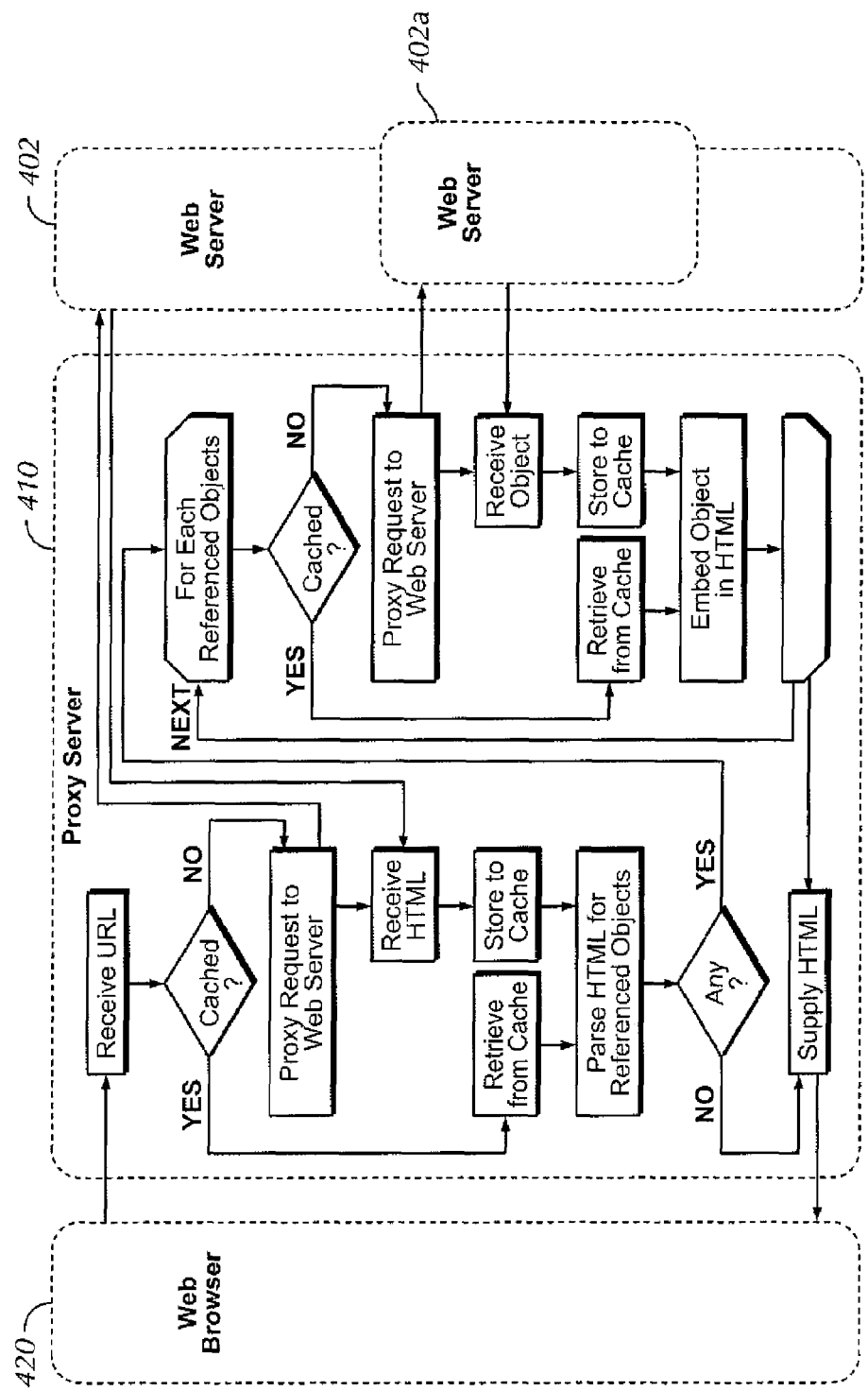
FIG. 4 is a flow chart illustrating operation of an exemplary caching server realization in accordance with the present invention.

FIG. 4 is a flow chart illustrating operation of an exemplary caching proxy server realization in accordance with the present invention. In the realization of FIG. 4, information objects are cached individually and a composite HTML document is dynamically prepared from individual information objects. As before, aspects of the realization are described in the context of a web-oriented information content and tools, although based on the description herein, persons of ordinary skill in the art will appreciate applications to other information content and tools including those associated with other hypermedia encodings or markup language encodings such as SGML, XML, etc. Caching proxy server 410 receives a URL request from web browser 420. If the corresponding HTML document is cached, caching proxy server 410 retrieves the HTML document from cache. Otherwise, caching proxy server 410 obtains the HTML document from web server 402. Assuming that the obtained HTML document is cacheable in accordance with the particular caching proxy server's algorithm, the obtained HTML document is stored to cache. Examples of HTML documents that may be non-cacheable include those with Cache-Control metadata attributes of Private, No-Cache or No-Store. Particular caching policies, resolution algorithms and replacement algorithms are implementation dependent.

Realizations in accordance with the present invention may implement any suitable caching policies, resolution algorithms and/or replacement algorithms.

Whether retrieved from cache or obtained from web browser 420, the HTML document is parsed for referenced objects. If no objects are referenced, the HTML document is supplied to web browser 420 in response to the received URL. However, if additional objects are referenced, caching proxy server 410 obtains each referenced object without first supplying the HTML document (with unresolved references) to web browser 420. The referenced objects may themselves be cached or uncached. If cached, a referenced object is retrieved and embedded in the HTML document. If uncached, the referenced object is obtained from a corresponding web server (e.g., web server 402A) and embedded in the HTML document. Note that, in general, referenced objects may be served from the same, or from a different, information server than the referencing object. In one realization, each retrieved or obtained object is embedded in the HTML document by replacing the original referencing element (e.g., an <img src="demo. gif">element) with a corresponding literal object encoded as an HTML 4 OBJECT element. The corresponding literal object encoding is prepared from the retrieved or obtained object. Once each referenced object has been resolved, an HTML document based on that served by web server 402, but with individual references replaced with literal encodings of the referenced objects, is supplied to web browser 420.

Preferably, each reference in the HTML document is resolved and replaced with literal data before supply to web browser 420. However, persons of ordinary skill in the art will appreciate that, for a particular HTML document, resolution of some references may be deferred to web browser 420 without departing from the spirit of the present invention. For example, in some realizations, there is a tradeoff between the size of the object (i.e., the time required to encode and embed the object) and the time saved by a reduction in network requests and responses. This tradeoff may be particularly relevant for very large objects or where large numbers of objects are referenced in a source document. In such cases, an earlier partial rendering may be preferable even if at the expense of increased total time for back-and-forth request response traffic. Other situations in which resolution of some references may be deferred include those where subsequent references to the to-be-embedded object are unlikely and for which fixed costs of encoding (and in some realizations, embedding) the object are unlikely to recovered over subsequent accesses. More generally, in some realizations, decisions regarding whether or not to cache a particular object may similarly affect decisions regarding embedding. In short, some configurations in accordance with the present invention may encode and embed less than all objects referenced in particular source documents. Based on the description herein, and based on particulars of a given implementation, network, or information object mix, persons of ordinary skill in the art will appreciate suitable strategies for selecting particular references for resolution and replacement with literal data.

For a particular realization or situation, much (though necessarily not all) of the back-and-forth request/response traffic between web browser 420 and caching proxy server 410 is eliminated. References resolved by caching proxy server 410 are preferably cached thereby to support subsequent references. However, as suggested above, individual objects may or may not be cached once resolved, in accordance with the particular caching policies implemented by the caching proxy server and in accordance with any cache control metadata associated with a particular object.

Figure 5:
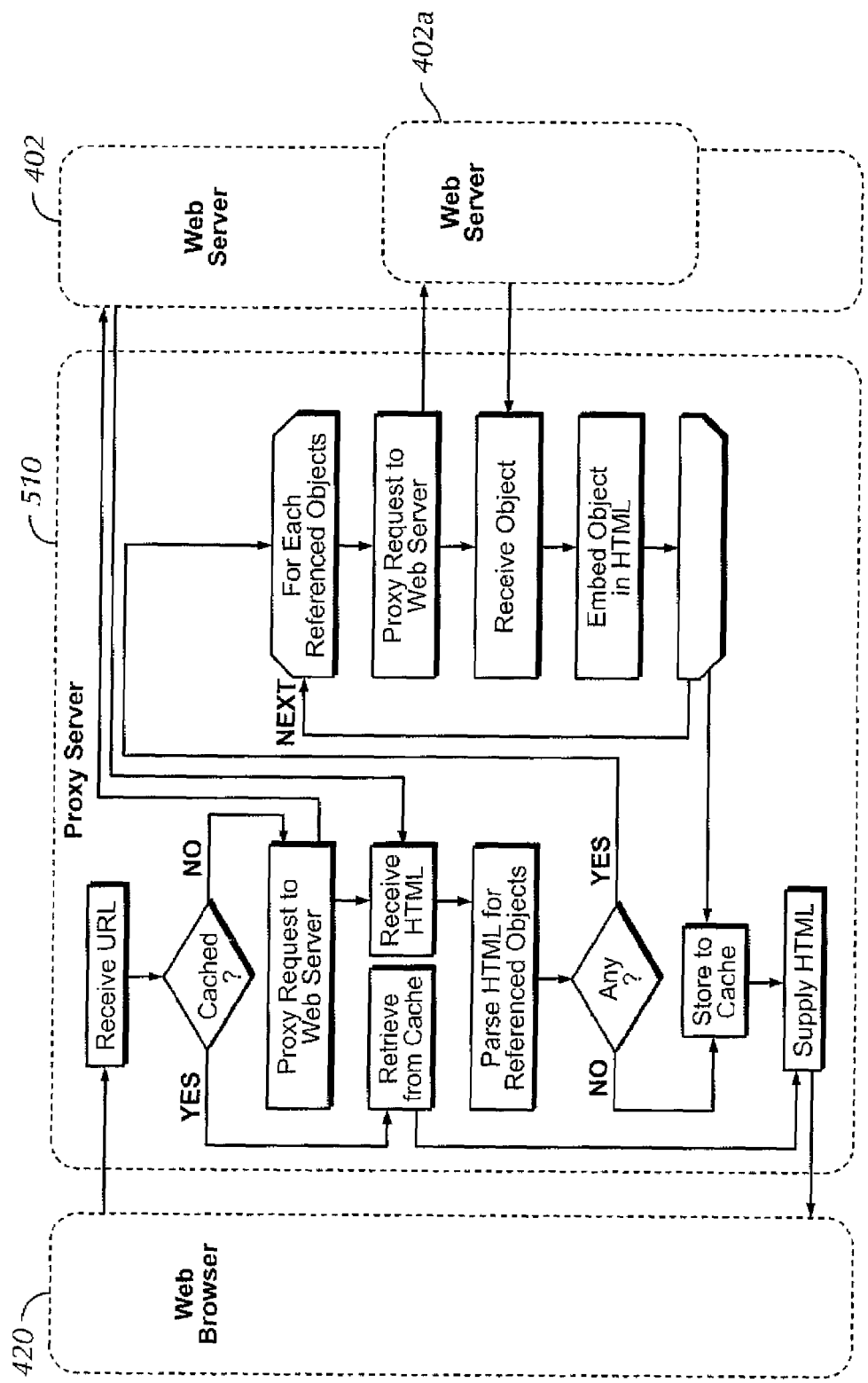
FIG. 5 is a flow chart illustrating operation of another exemplary caching server realization in accordance with the present invention.

FIG. 5 is a flow chart illustrating operation of another exemplary caching proxy server realization in accordance with the present invention. In the realization of FIG. 5, a composite HTML document is prepared from individual information objects and cached as a composite object for supply in response to a corresponding URL. Note that in this realization, the cached instance corresponding to a particular URL differs from that served by an authoritative information resource therefor (e.g., web server 402). By caching the prepared composite object, caching proxy server 510 may service a subsequent request with the corresponding URL without parsing a cached HTML document for references and without re-embedding literal representations of the referenced objects in the composite object. Although not illustrated in FIG. 5, caching proxy server 510 may optionally cache referenced objects as well. In this way, other referencing paths (e.g., other HTML documents) that include such objects may be serviced by caching proxy server 510 from a local store.

Figure 6:
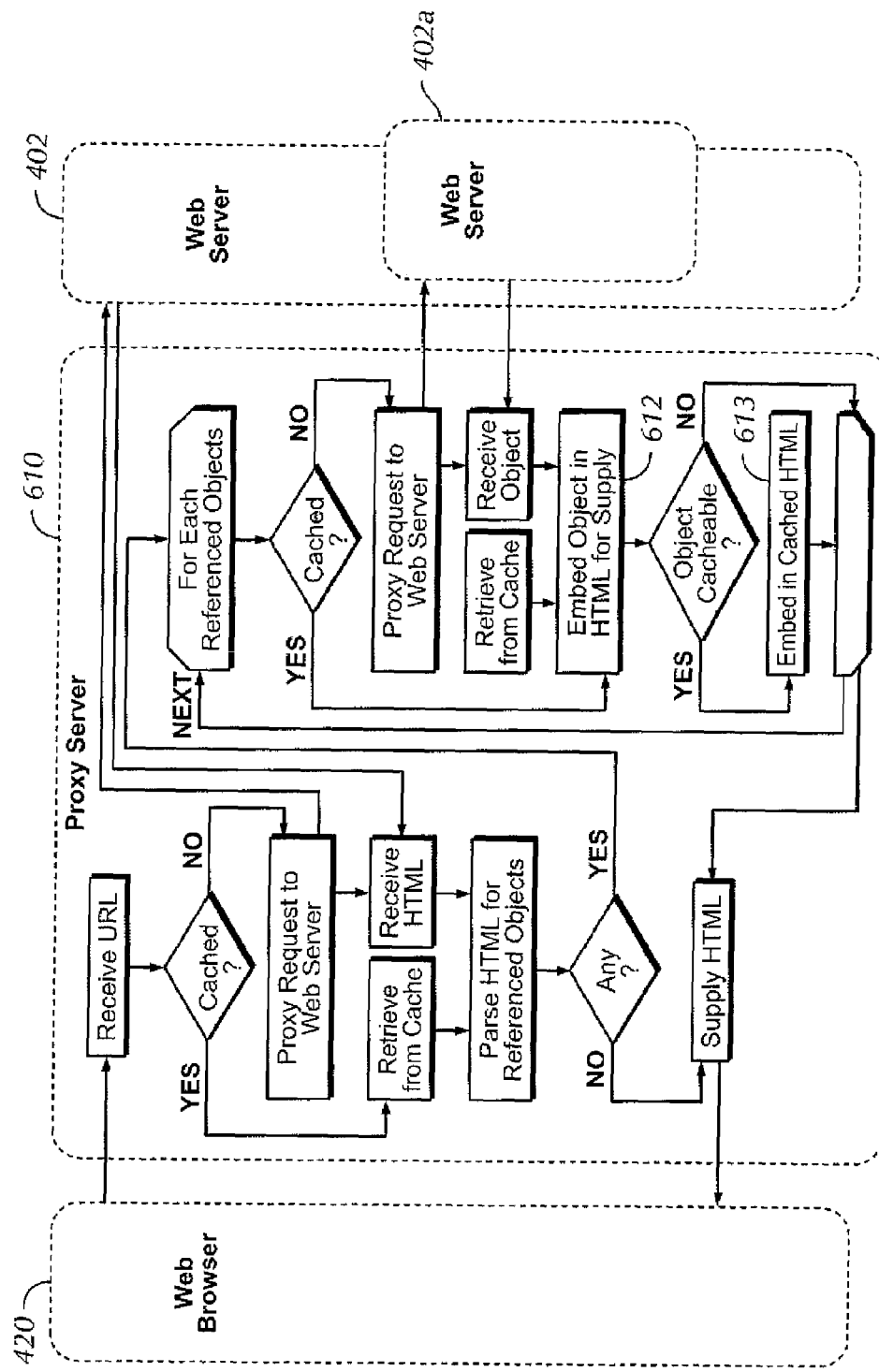
FIG. 6 is a flow chart illustrating operation of yet another exemplary caching server realization in accordance with the present invention.

FIG. 6 is a flow chart illustrating operation of yet another exemplary caching proxy server realization in accordance with the present invention. In the realization of FIG. 6, a composite HTML document is prepared from individual information objects for supply in response to a corresponding URL. Note that the realization of FIG. 6 contemplates that certain referenced objects may not be cacheable. Accordingly, although literal instances of referenced objects are embedded (612) in an HTML document supplied (614) to web browser 420, a cached version of the composite HTML document may embed only cacheable objects (see 613). As a result, the HTML document cached by caching proxy server 610 as corresponding to a requested URL may include some previously resolved (and cacheable) objects embedded as literal data therein and some previously resolved (but uncacheable) objects by reference. Accordingly, references in such a cached HTML document, when retrieved (611), are once again resolved by caching proxy server 610 and embedded (612) in an instance of the HTML document for supply to web browser 420. As before, although not illustrated in FIG. 6, caching proxy server 610 may individually cache referenced (and cacheable) objects as well. In this way, other referencing paths (e.g., other HTML documents) that include such objects may be serviced by caching proxy server 610 from a local store.

EXEMPLARY IMPLEMENTATIONS

In an exemplary embodiment, at least some of the above-described components are implemented as a caching proxy server in the context of a commercially-available web server environment. For example, the suitable implementation environments include those based on Netscape® Proxy Server or Apache Proxy Server implementations. Netscape is a registered trademark of Netscape Communications Corporation in the United States and other countries. While the description herein is focused on aspects of a dynamic object data embedding, rather than on peculiarities of any specific implementation environment, it is envisioned that implementations in accordance with the teachings of the present invention may be implemented in the context of many commercially-available networked information service environments, including web server environments, as well as in custom environments and environments that in the future will be developed. However, to facilitate an understanding of broad concepts using a specific exemplary environment, and without limitation, the description herein may include terminology specific to web servers and a proxy server type cache implementations. Nonetheless, based on this description, persons of ordinary skill in the art will appreciate implementations suitable for other environments. The scope of the invention, as defined by the claims that follow, is not limited to any specific implementation environment.

While the invention has been described with reference to various embodiments, it will be understood that these embodiments are illustrative and that the scope of the invention is not limited to them. Many variations, modifications, additions, and improvements are possible. For example, in a given implementation some references to information objects may be resolved by a user agent. Although web browser and proxy server applications have been described, embodiments in accordance with the present invention are not limited thereto. In particular, information object embedding techniques described herein may be employed at a user agent (e.g., in a local cache implementation for a browser), at an intermediary information service (e.g., at a proxy server, at a transparent cache, or at an information server to which requests are redirected), or at authoritative information server (or servers) for the requested information objects. Particular encodings of embedded objects are merely exemplary.

More generally, plural instances may be provided for components described herein as a single instance. Finally, boundaries between various components, services, and data stores are somewhat arbitrary, and particular operations are illustrated in the context of specific illustrative configurations. Other allocations of functionality are envisioned and may fall within the scope of claims that follow. Structures and functionality presented as discrete components in the exemplary configurations may be implemented as a combined structure or component. These and other variations, modifications, additions, and improvements may fall within the scope of the invention as defined in the claims that follow.

What is claimed is:

1. A method of improving performance in a distributed information resource environment, the method comprising:
   retrieving a first information object corresponding to a first identifier, the first information object itself including a second identifier corresponding to a second information object and a third identifier corresponding to a third information object;
   retrieving the second information object, wherein at least one of the first information object and the second information object is from a remote store thereof;
   applying a reference resolution strategy to defer resolution of the third identifier, wherein the reference resolution strategy is based on a tradeoff between encoding time for information objects and response time; and
   thereafter supplying, in response to the first identifier, an information encoding of the first information object, wherein the information encoding includes the third identifier and a literal encoding of the second information object.

2. The method of claim 1, wherein the supplied information encoding includes a markup language encoding with a literal representation of the first information object included therein.

3. The method of claim 1, wherein the retrieved first information object includes a markup language encoding with a reference to an external encoding of the second information object.

4. The method of claim 1,
   wherein the retrieving of the first information object and the second information object and the supplying are performed by a proxy server; and
   wherein retrieving of the first information object and the second information object is from information servers therefor.

5. The method of claim 1, further comprising:
   receiving the first identifier from a web browser; and
   in response thereto, supplying the web browser with the information encoding of the first information object.

6. The method of claim 1,
   wherein the first information object includes a HyperText Markup Language (HTML) encoding of a web page;
   wherein the second identifier includes a Uniform Resource Locator (URL); and
   wherein the second information object includes at least one selected from a group consisting of an image encoding, a moving picture encoding, a video encoding, an audio encoding, an application encoding, an applet encoding, a text encoding, and an HTML encoding.

7. The method of claim 1, further comprising:
   receiving the first identifier from a user agent; and
   performing the retrieving of at least one of the first information object and the second information object in response thereto.

8. A method of operating a network cache, the method comprising:
   in response to an information request for a first information object that itself includes a first identifier for a second information object and a second identifier for a third information object, obtaining both the first information object and the second information object, wherein at least one of the first information object and the second information object is remote from the network cache;
   applying a reference resolution strategy to defer resolution of the second identifier, wherein the reference resolution strategy is based on a tradeoff between encoding time for information objects and response time; and
   supplying an information encoding of the first information object, wherein the information encoding includes the second identifier and a literal encoding of the second information object.

9. The method of claim 8,
   wherein the obtained first information object encodes the second information object using a resource retrieval markup element and attributes; and
   wherein the supplied information encoding of the first information object encodes the second information object as a literally included object and attributes.

10. The method of claim 8, wherein the obtaining of at least one of the first information object and the second information object is from a data store local to the network cache.

11. The method of claim 8, wherein the obtaining of at least one of the first information object and the second information object is from an information server displaced from the network cache by at least a communications link.

12. The method of claim 8, further comprising:
   storing instances of the first information object and the second information object in a data store local to the network cache; and
   thereafter performing the supplying using the stored instances.

13. In a hypermedia information environment, a method of improving performance, the method comprising:

caching a first information object and a second information object, wherein a first representation of the first information object includes a first hypermedia link identifying the second information object and a second hypermedia link identifying a third information object;

applying a reference resolution strategy to defer resolution of the second hypermedia link, wherein the reference resolution strategy is based on a tradeoff between encoding time for information objects and response time; and supplying, in response to a request for the first information object, a second representation of the first information object, the second representation including the second hypermedia link and a literal encoding of the second information object.

14. The method of claim 13, wherein the second representation includes a markup language encoding with a literal representation of the first information object included therein.

15. The method of claim 13, wherein the first information object includes a markup language encoding with a reference to an external encoding of the additional information object.

16. The method of claim 13, wherein the caching of the first information object and the second information object and the supplying are performed by a proxy server; and wherein the first information object and the second information object are retrieved from one or more information servers therefor.

17. The method of claim 13, further comprising:

receiving a first identifier corresponding to the first information object from a web browser; and in response thereto, supplying the web browser with the second representation of the first information object.

18. The method of claim 13, wherein the first information object includes a HyperText Markup Language (HTML) encoding of a web page;

wherein the hyperlink includes a Uniform Resource Locator (URL); and wherein the second information object includes at least one selected from a group consisting of an image encoding, a moving picture encoding, a video encoding, an audio encoding, an application encoding, an applet encoding, a text encoding, and an HTML encoding.

19. The method of claim 13, further comprising:

receiving the first identifier from a user agent; and performing the retrieving of at least one of the first information object and the second information object in response thereto.

20. A cache for a computer network comprising:

a data store; and a information service interface responsive to requests for a first information object, wherein the first information object includes a first reference to a second information object and a second reference to a third information object, wherein in response to at least one request for the first information object from at least one client agent, the information service interface:

applies a reference resolution strategy to defer resolution of the second reference, wherein the reference resolution strategy is based on a tradeoff between encoding time for information objects and response time, and supplies an encoding of the first information object, wherein the encoding includes the second reference and a literal encoding of the second information object, and wherein at least one of the first information object and the second information object is supplied from the data store rather than from an information server that served the first information object.

21. The cache of claim 20, configured as a proxy cache, wherein the cache receives the at least one request for the first information object from the at least one client agent as a proxy for the information server.

22. The cache of claim 20, configured as a transparent proxy cache, wherein the cache intercepts the at least one request for the first information object from the at least one client agent and services the at least one request in lieu of the at least one information server.

23. The cache of claim 20, configured as a transparent proxy cache with redirection, wherein the at least one request for the first information object from the at least one client agent is redirected to the cache by a redirector; and wherein the cache receives the at least one request for the first information object from the at least one client agent as a proxy for the at least one information server.

24. A method of making a computer readable encoding corresponding to a first information object that itself includes a first reference to a second information object and a second reference to a third information object, the method comprising:

caching both the first information object and a second information object;

applying a reference resolution strategy to defer resolution of the second reference, wherein the reference resolution strategy is based on a tradeoff between encoding time for information objects and response time; and embedding the second reference and a literal encoding of the second information object in a representation of the first information object for supply in response to a request for the first information object.

25. The method of claim 24, further comprising:

supplying, in response to the request for the first information object, the computer readable encoding embedding the second reference and the literal encoding of the second information object in the representation of the first information object.

26. A computer readable medium comprising computer program instructions stored therein which, when executed, perform:

receiving a request for a first information object, wherein the first information object includes a first reference to a second information object and a second reference to a third information object;

retrieving an encoding of the first information object from a local cache, if the first information object is available in the local cache;

retrieving the encoding of the first information object from a first information service therefor, if the first information object is not available in the local cache;

applying a reference resolution strategy to defer resolution of the second reference, wherein the reference resolution strategy is based on a tradeoff between encoding time for information objects and response time; and supplying, in response to the request, an information encoding of the first information object with the second reference and a literal encoding of the second information object included therein.

27. The computer readable medium of claim 26, further comprising computer program instructions stored therein which, when executed, perform:
receiving a request for caching the first information object and the second information object, wherein a first representation of the first information object includes a hypermedia link identifying the second information object; and
supplying, in response to a request for the first information object, a second representation of the first information object, the second representation including the literal encoding of the second information object.

28. An apparatus comprising:
means for receiving a request for a first information object served by a first information service, wherein the first information object, as served by the first information service, includes a first reference to a second information object and a second reference to a third information object;
means for applying a reference resolution strategy to defer resolution of the second reference, wherein the reference resolution strategy is based on a tradeoff between encoding time for information objects and response time; and
means for supplying, in response to the request, an encoding of the first information object with the second reference and a literal encoding of the second information object included therein.

29. The apparatus of claim 28, further comprising:
means for caching the first information object and the second information object, wherein a first representation of the first information object includes a hypermedia link identifying the second information object; and
means for supplying, in response to a request for the first information object, a second representation of the first information object, the second representation including the literal encoding of the second information object.

30. A method for providing, from a network cache, a requested first information object, the method comprising:
responsive to a request from a first user agent for the first information object, retrieving both the first information object and a second information object, wherein the first information object includes a first reference for the second information object and a second reference for a third information object;
applying a reference resolution strategy to defer resolution of the second reference, wherein the reference resolution strategy is based on a tradeoff between encoding time for information objects and response time;
supplying, in response to the request, an encoding of the first information object with the second reference and a literal encoding of the second information object included therein; and
supplying in response to subsequent requests from the first user agent for the first information object, and without retrieval of the second information object, the encoding of the first information object with the second reference and the literal encoding of the second information object included therein.

31. The method of claim 30 wherein the network cache is a proxy server.

32. The method of claim 30 wherein the first information object is a web page and the second information object is at least one selected from a group consisting of an image file, an audio file, an video file, a hypertext markup language file, and an applet.

33. The method of claim 30 further comprising:
responsive to a second user agent's request for the first information object, retrieving both the first information object and the second information object referenced therein; and
supplying, in response to the second user agent's request, the encoding of the first information object with the second reference and the literal encoding of the second information object included therein.

34. The method of claim 30 wherein at least one of the first information object and the second information object is retrieved from a source remote from the network cache.

35. A network proxy to:
receive a first user agent's request for a first information object, wherein the first information object includes a first reference-to a second information object and a second reference to a third information object;
apply a reference resolution strategy to defer resolution of the second reference, wherein the reference resolution strategy is based on a tradeoff between encoding time for information objects and response time; and
provide to the first user agent, in response to the request, an encoding of the first information object, wherein the encoding of the first information object includes the second reference and a literal encoding of the second information object, and wherein the second information object was retrieved from a remote source.

36. The network proxy of claim 35, wherein the network proxy further:
provides, in response to a second user agent's request for the first information object, the encoding of the first information object with the second information object literally embedded therein.

37. The network proxy of claim 35 wherein the first information object is a web page and the second information object is at least one selected from a group consisting of an image file, an audio file, a video file, a hypertext markup language file, and an applet.

38. The network proxy of claim 35, wherein the network proxy provides the encoding of the first information object with the second information object literally embedded therein in response to subsequent requests from the first user agent for the first information object.

39. A method for providing a first information object from a network cache, the method comprising:
supplying a response to a first request and to subsequent requests for the first information object, wherein the first information object includes a first reference to a second information object and a second reference to a third information object; and
applying a reference resolution strategy to defer resolution of the second reference, wherein the reference resolution strategy is based on a tradeoff between encoding time for information objects and response time,
wherein the response includes the second reference and a literal encoding of the second information object, and
wherein the first request and at least one of the subsequent requests are from the same source.

40. The method of claim 39 further comprising retrieving at least one of the first information object and the second information object from a host that is remote from the network cache.

41. The method of claim 39 wherein the network cache is hosted on a proxy server.

42. The method of claim 39 wherein the first information object is a web page and the second information object includes at least one selected from a group consisting of a web page, a video file, an audio file, an image file, a hypertext markup language file, and an applet.

43. The method of claim 1, wherein the reference resolution strategy is further based on a likelihood of subsequent accesses to information objects.

* * * * *

UNITED STATES PATENT AND TRADEMARK OFFICE
CERTIFICATE OF CORRECTION

PATENT NO.       : 7,340,499 B1
APPLICATION NO.  : 09/454427
DATED            : March 4, 2008
INVENTOR(S)      : Karen A. Casella It is certified that error appears in the above-identified patent and that said Letters Patent is hereby corrected as shown below:

In Claim 22, column 14 (line 17), delete --at least one--.

In Claim 23, column 14 (line 25), delete --at least one--.

Signed and Sealed this

Tenth Day of June, 2008

JON W. DUDAS
*Director of the United States Patent and Trademark Office*